United States Patent [19]

Rader

[11] 4,002,365
[45] Jan. 11, 1977

[54] FOOD HANDLING TONGS

[76] Inventor: James A. Rader, Rte. 3, Lamar, Mo. 64759

[22] Filed: June 27, 1975

[21] Appl. No.: 591,130

[52] U.S. Cl. .................................. 294/8; 267/118
[51] Int. Cl.² ............................................ A47J 43/28
[58] Field of Search ............... 294/8, 3, 6, 7, 118, 294/11, 19 R, 28, 30, 34, 103 R, 104; D7/105, 102

[56] References Cited
UNITED STATES PATENTS

| | | | |
|---|---|---|---|
| 2,457,689 | 12/1948 | Krieg | 294/118 |
| 2,573,922 | 11/1951 | Meyer | 294/7 |
| 3,361,468 | 1/1968 | Case | 294/8 |
| D236,678 | 9/1975 | Rader | 294/8 |

Primary Examiner—James B. Marbert
Attorney, Agent, or Firm—Oltsch & Knoblock

[57] ABSTRACT

Tongs for handling food items upon a grill in which the food gripping parts of the tongs are displaced laterally as well as apart when opened to enable the user of the tongs to see the food item as it is being gripped by the tongs.

2 Claims, 7 Drawing Figures

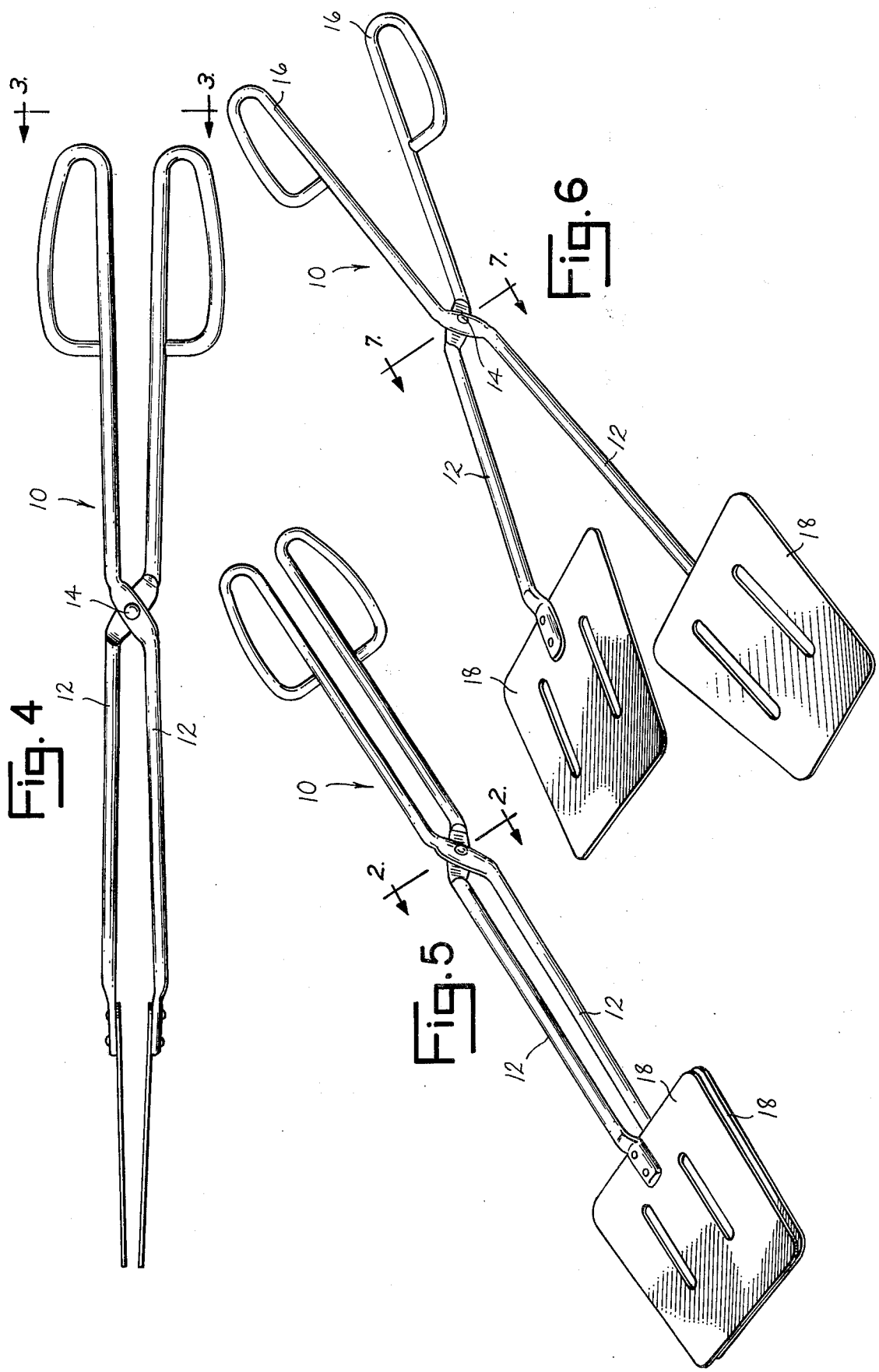

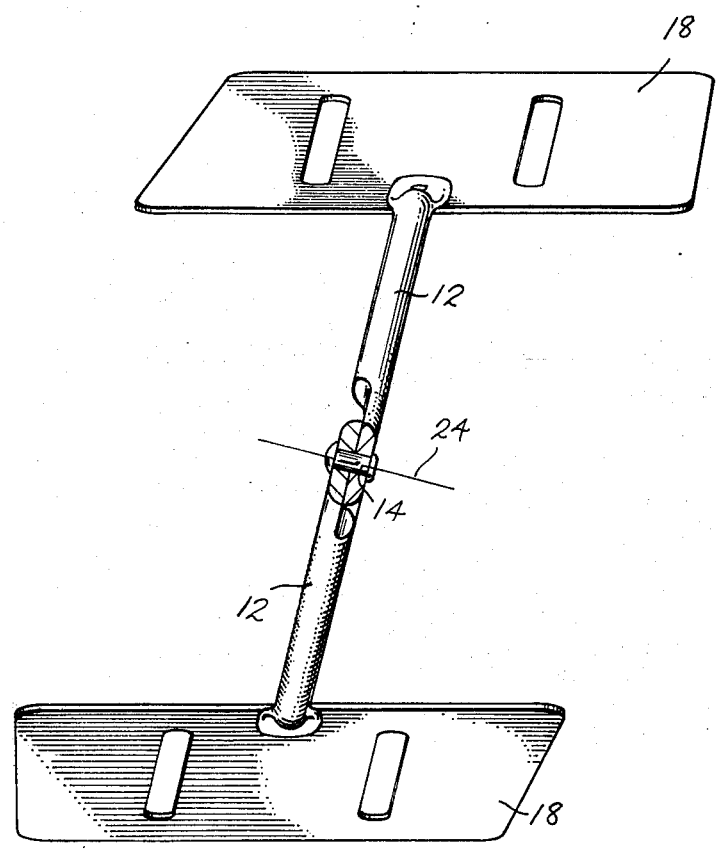

FOOD HANDLING TONGS

SUMMARY OF THE INVENTION

This invention relates to tongs utilized for gripping food upon a grill.

The tongs of this invention include arms which are pivotally connected together and which have corresponding ends formed into handles. The opposite corresponding ends of the arms each carry a plate between which the food item is compressed when the arm handles are squeezed. The plates are arranged in association with the arms so that as the plates are shifted from an open to a closed position around the food item with the lowermost plate being positioned under the item, the upper plate will shift from a laterally spaced offset position to a generally parallel superimposed position over the bottom plate. This lateral offset of one plate relative to the other when the plates are open enables the user of the tongs to visually observe the food item as it is being grasped by the tongs.

Accordingly, it is an object of this invention to provide tongs for grasping and turning food items upon a grill which enables the user of the tongs to visually observe the food item as the item is being grasped by the tongs.

Another object of this invention is to provide tongs which are for handling food items and which are of simplified, easy operation.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 4 is a side view of the tongs.

FIG. 5 is a perspective view with the tongs shown in a closed food gripping position.

FIG. 6 is a perspective view of the tongs shown in an open position.

FIG. 7 is a sectional view of the tongs taken along line 7—7 of FIG. 6.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
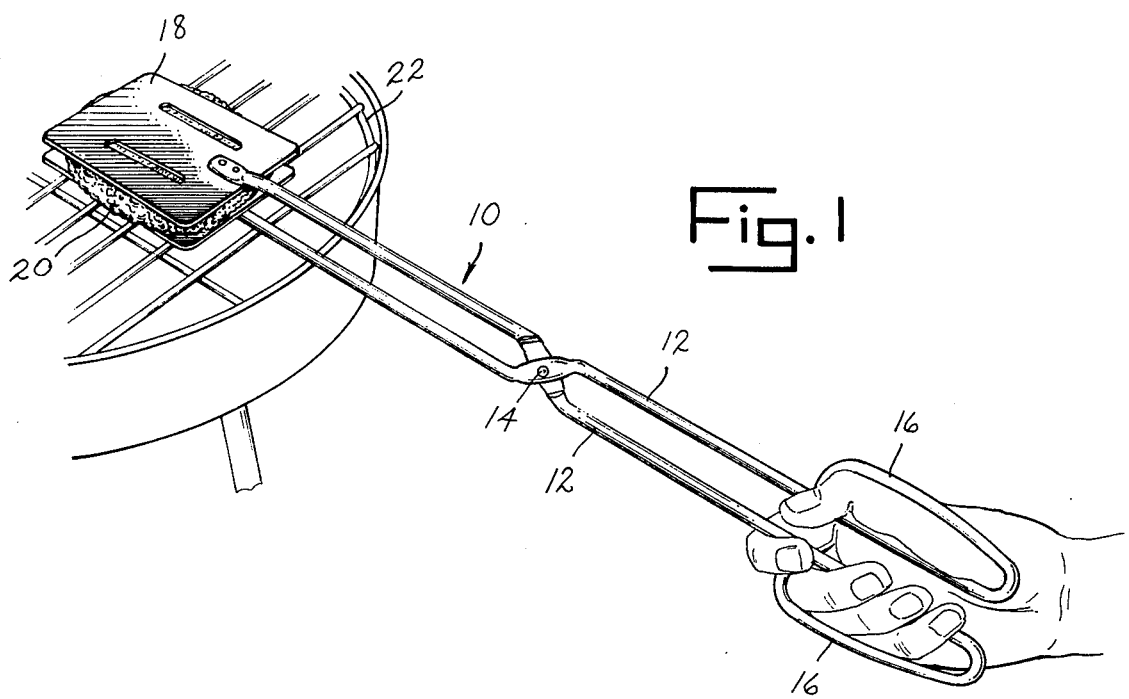
FIG. 1 is a perspective view of the tongs being utilized for handling a food item upon a grill.
Figure 2:
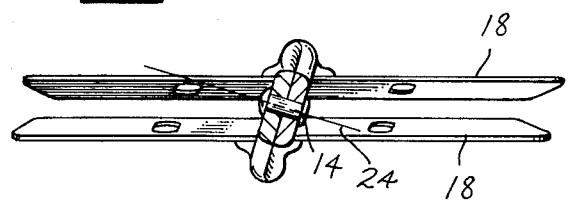
FIG. 2 is a sectional view of the tongs taken along line 2—2 of FIG. 5 showing the tongs in a closed position.
Figure 3:
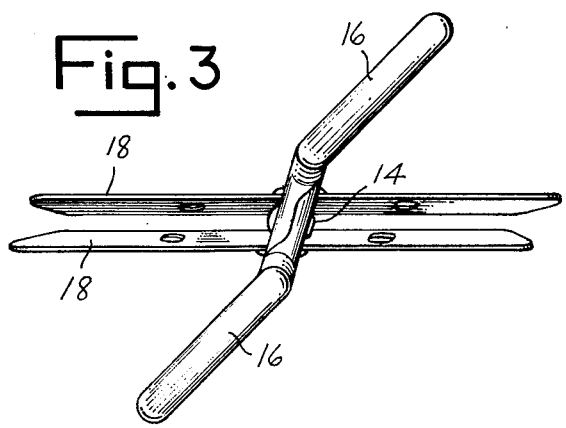
FIG. 3 is an end view of the tongs as seen from line 3—3 of FIG. 4.

Tongs 10 include a pair of arms 12 which are pivotally connected together by a pin 14. One corresponding end of each arm 12 is formed into a handle 16 and the opposite end of each arm carries a plate 18. Pivotal movement of arms 12 about pin 14 causes plates 18 to shift between the generally superimposed food grasping position shown in FIGS. 1, 2 and 5 and an open position such as that shown in FIGS. 6 and 7.

Plates 18 are laterally offset when the tongs are in their open position. As the tongs are closed to bring plates 18 together in a food grasping position, the upper plate shifts toward and laterally over the lower plate. This lateral displacement of the upper plate 18 relative to the lower plate 18 when the tongs are open enables the user of the tongs to more clearly see the food item 20 as the lower plate is being slid under the food item in preparation to be grasped and turned or removed from grill 22 shown in FIG. 1. This movement of the upper plate 18 relative to the lower plate 18 is effected by having the pivot axis 24 defined by pin 14 of arms 12 angled relative to the plane of each of the plates 18. This angular relationship causes arms 12 when pivoted about pin 14 to move in a plane which intersects the planes of plates 18 at an other than 90° angle. In the preferred embodiment this angle is approximately 20 degrees.

It is to be understood that the invention is not to be limited to the details above given but may be modified within the scope of the appended claims.

What I claim is:

1. Tongs for handling a food item upon a grill, said tongs comprising a pair of arms each having first and second ends, said arms overlapping at a corresponding location between said first and second ends, means pivotally connecting said arms together at said corresponding location, said first arm ends being formed into cooperating handle means, a pair of plate members, one plate member connected to each arm at its second end, said tongs having a closed food item gripping position wherein said plate members spacedly overlie one another in a generally superimposed orientation and an open position wherein said plate members are laterally offset and further spaced apart, said handle means for pivotally moving said arms about said pivot connecting means, said pivot connecting means including means for shifting said arms in a plane extending at an acute angle to the plane of each plate member to cause said tongs to be shifted between their open and closed positions with said lateral offset between the plate members when said tongs are in their open position permitting viewing of the food item as said item is being gripped.

2. The tongs of claim 1 wherein said pivot connecting means includes a pin extending through said arms and defining the pivot axis of said arms, said pin extending at angle to the plane of each plate member.

* * * * *